No. 716,285. Patented Dec. 16, 1902.
J. ST. CLAIR.
AMUSEMENT APPARATUS.
(Application filed Oct. 29, 1902.)
(No Model.) 2 Sheets—Sheet 1.
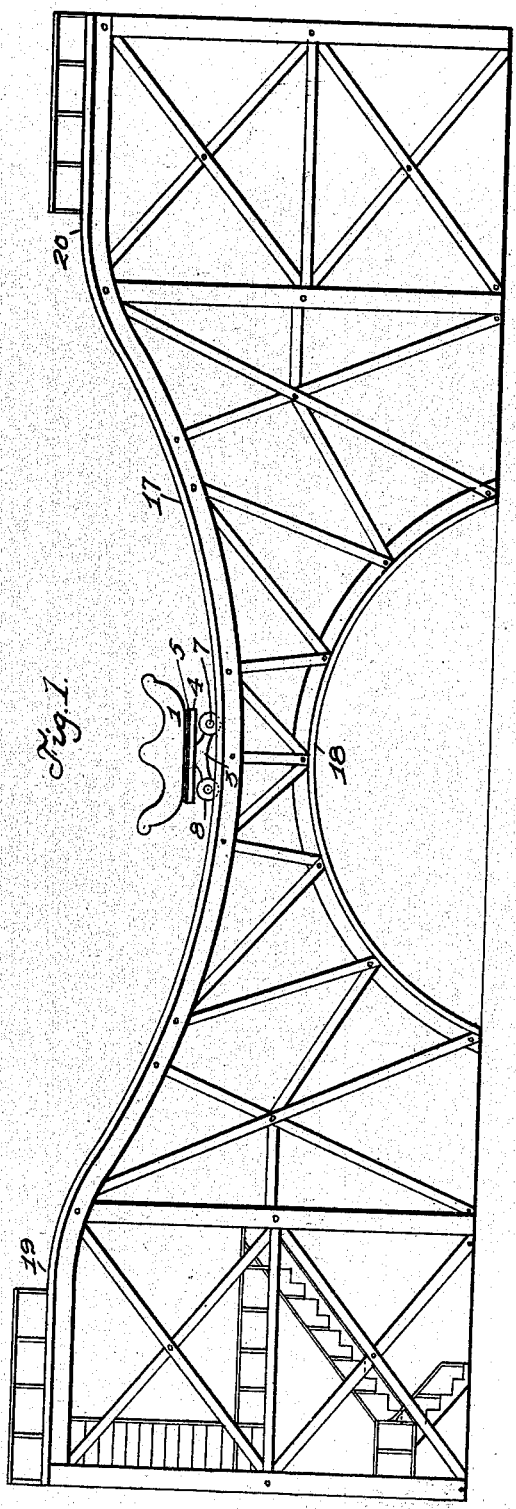
Witnesses
Alfred O. Eicks
M. S. Irion
Inventor
Joseph St Clair
by Higdon & Longan attys.

No. 716,285. Patented Dec. 16, 1902.
J. ST. CLAIR.
AMUSEMENT APPARATUS.
(Application filed Oct. 29, 1902.)
(No Model.) 2 Sheets—Sheet 2.
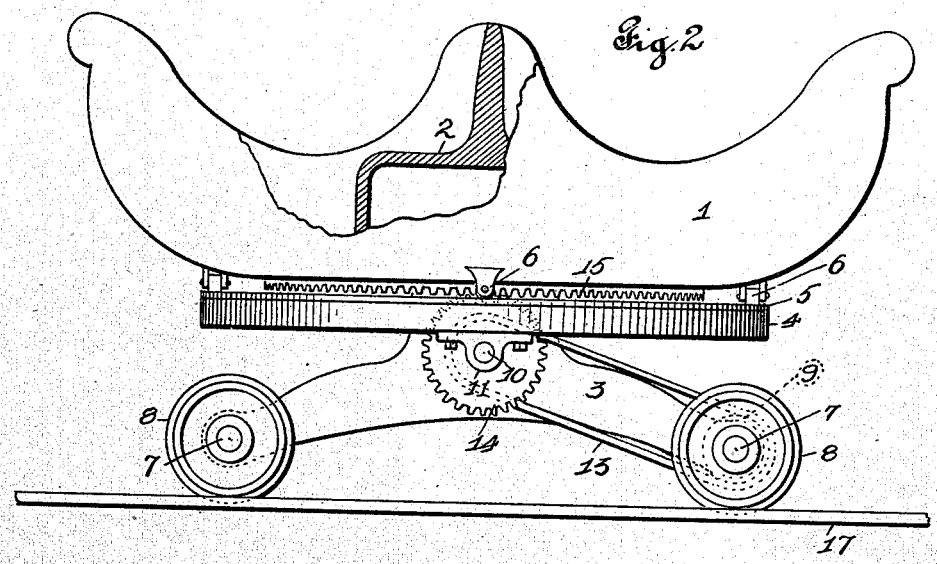
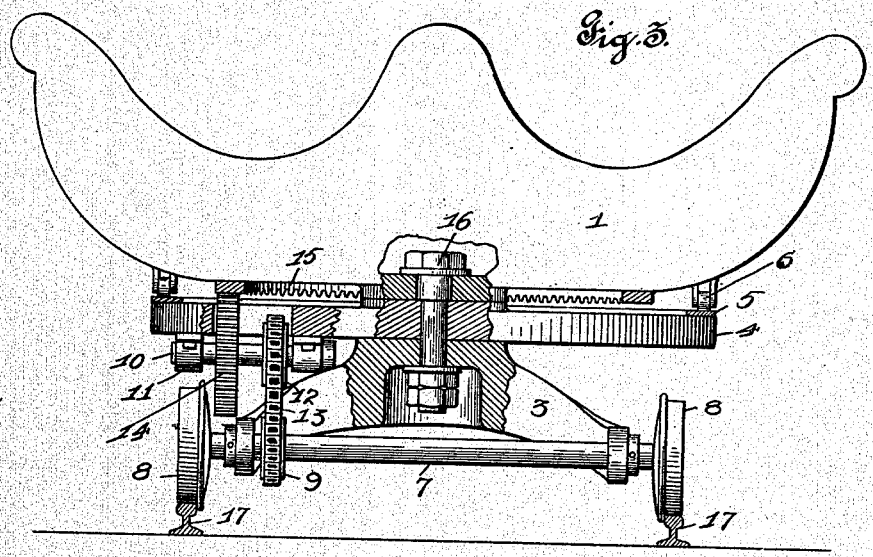
Witnesses
Alfred D. Ticker
M. S. Dun
Inventor
Joseph St Clair
by Higdon & Longan Attys.

United States Patent Office.

JOSEPH ST. CLAIR, OF ST. LOUIS, MISSOURI, ASSIGNOR TO THE ELEVATED WHIRLING SCENIC RAILWAY COMPANY, OF ST. LOUIS, MISSOURI, A CORPORATION OF MISSOURI.

AMUSEMENT APPARATUS.

SPECIFICATION forming part of Letters Patent No. 716,285, dated December 16, 1902.

Application filed October 29, 1902. Serial No. 129,263. (No model.)

*To all whom it may concern:*

Be it known that I, JOSEPH ST. CLAIR, of the city of St. Louis, State of Missouri, have invented certain new and useful Improvements in Amusement Apparatus, of which the following is a full, clear, and exact description, reference being had to the accompanying drawings, forming a part hereof.

My invention consists of an improvement in amusement-cars, and has for its object to provide an improved car which shall revolve during its travel.

My invention will be more readily understood by reference to the accompanying drawings, in which—

Figure 1 is a side view of a car embodying my invention in place upon tracks carried by a truss-frame. Fig. 2 is a side view of a car embodying my invention, having part broken away. Fig. 3 is an end view of a car embodying my invention, showing parts broken away.

I employ a fancifully-shaped car-body 1, containing the double seat 2, in order that the passengers may sit back to back. The truck-frame 3 carries the circular car-supporting platform 4, which is provided about its outer edge with the circular track 5, upon which the rollers 6, which are attached to the bottom of the car-body 1, travel. The truck-frame 3 is provided with the axles 7 and the wheels 8. Upon either of the axles 7 a sprocket 9 is fixed, and upon the bottom of the platform 4 the shaft 10 is journaled in bearings 11. The shaft 10 is provided with the sprocket 12, which is connected to the sprocket 9 with the chain 13. The shaft 10 is also provided with a gear-wheel 14, which intermeshes with the face-wheel 15 upon the bottom of the car-body 1. The car-body 1 is mounted upon the truck 3 by the bolt 16. The tracks 17 are preferably mounted, as shown in Fig. 1, upon the truss-frame 18 or other similar supporting means, the tracks running downward and upward and connecting the passenger-platforms 19 and 20.

As shown in Fig. 1, the platform 19 is the receiving-platform, from which the amusement-car travels, and when the passengers are seated the car is started down the incline by an attendant. The progress of the car causes the revolution of the axles 7 and the transmission of motion through the means before indicated to the car-body, which is caused to revolve with a speed which increases with the forward movement of the car.

Having thus described my invention, what I claim as new, and desire to have secured to me by the grant of Letters Patent, is—

1. An amusement-car consisting of a car-body revolubly mounted upon a wheeled frame, the bottom of the car-body being provided with a face-wheel geared to an axle of the truck-frame, substantially as and for the purposes specified.

2. In an amusement-car, the combination of a platform mounted upon a wheeled truck, and carrying a circular track, a car-body provided upon its bottom with a face-wheel having geared connection with the axle of the truck-frame, substantially as specified.

3. In an amusement-wheel, the combination of a car-body provided with wheels and having a face-wheel upon its bottom and mounted upon a supporting-frame carried by wheels rigidly mounted upon axles, a sprocket mounted upon one of the axles, and connected by a chain to a sprocket mounted upon a shaft carried by the truck-frame, which shaft is provided with a gear-wheel which intermeshes with the face-wheel, and a central bolt whereby the car-body is connected to the truck-frame, substantially as and for the purposes specified.

4. An amusement-car propelled by gravity and mounted on curved tracks running between passenger-platforms, having a circular platform mounted upon the truck-frame and provided with a circular track about the outer edge of its upper face, and containing a gear-wheel driven by a chain-and-sprocket connection with the axle, and a car-body provided with a face-wheel intermeshing with the gear-wheel and having a wheel which travels about the circular track, substantially as and for the purposes specified.

In testimony whereof I affix my signature in presence of two witnesses.

JOSEPH ST. CLAIR.

Witnesses:
ALFRED A. EICKS,
M. G. IRION.